March 14, 1961  F. S. CRAIG ET AL  2,975,268
LIGHT SIGNAL
Filed Nov. 29, 1957
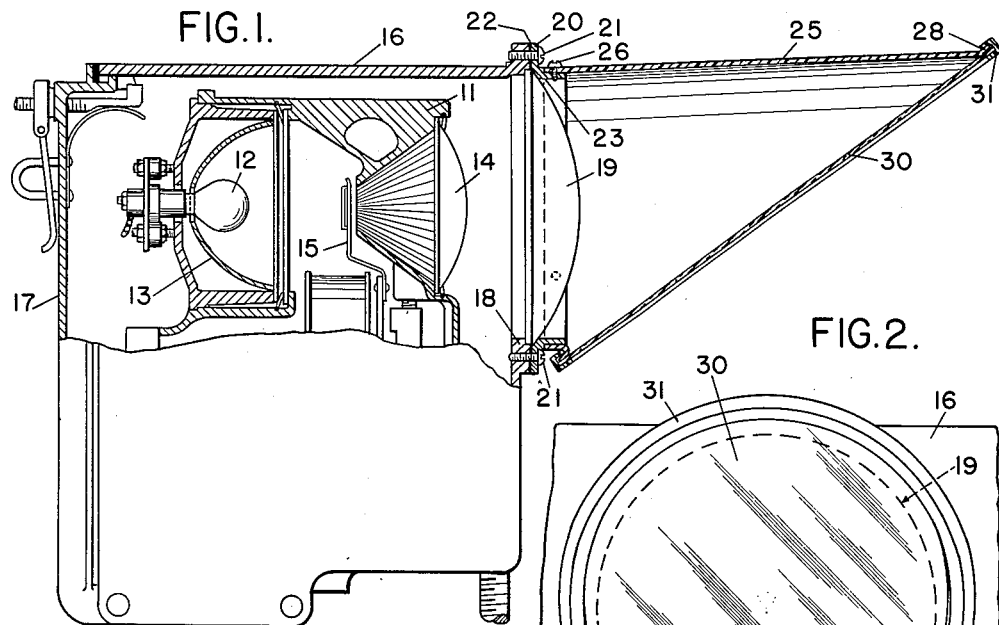
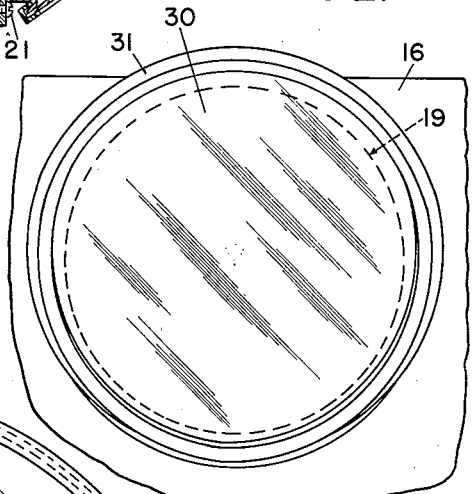
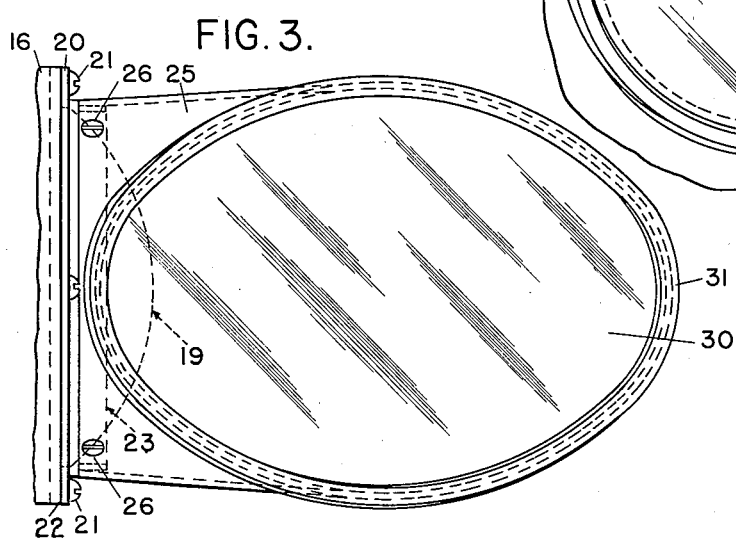
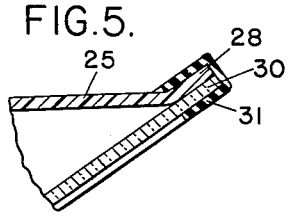
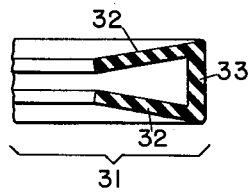
INVENTORS
F.S.CRAIG, J.Y.HOWARD
AND M.A.SCHEG
BY
Forest B. Hitchcock
THEIR ATTORNEY

United States Patent Office 2,975,268
Patented Mar. 14, 1961

2,975,268

LIGHT SIGNAL

Frank S. Craig, Chili, James Y. Howard, Spencerport, and Marcian A. Scheg, Rochester, N.Y., assignors to General Railway Signal Company, Rochester, N.Y.

Filed Nov. 29, 1957, Ser. No. 699,701

1 Claim. (Cl. 240—46.53)

This invention relates to a means for protecting a light signal lens from weather hazards, and more particularly relates to a hooded shielding device to prevent the accumulation of snow, sleet or the like on the lens.

In light units employed for signalling purposes at airports, street intersections, highway crossings and particularly on railroads where different colored light signals are displayed, the light density must be of sufficient quality so that the distinguishing color is visible at great distances. Also, such light units are usually equipped with dark colored hoods to help prevent phantom signal indications caused by outside light sources, such as direct sunlight or headlights, being directed into the signal unit and then being reflected back out.

When such light signal units are equipped with a hood, severe weather conditions cause snow or sleet to be driven under the hood to the extent that the light transmitting lens may be completely covered to a depth whereby no light is visible, or it may be covered only to the extent that the color light emitting therefrom is washed out and may be mistaken for a color different than intended. Also, a light signal unit not already equipped with a hood over its lens is obviously affected by wet snow or sleet as it accumulates thereon.

The present invention contemplates a protective covering for a light signal lens which permits the efficient transmission of light therefrom yet prevents the accumulation of wet snow or sleet thereon.

Generally speaking, the protective covering comprises a tubular hood member which completely surrounds the lens and is attached to the light unit casing. This hood member is provided with an inclined front opening. The incline extends downward and inward from the top front to the bottom rear of the hood structure, thus presenting an oval shaped opening, the plane of which is approximately on an angle of thirty-five degrees from the horizontal. An oval shaped cover of transparent material is placed over the opening in the hood member and attached thereto by a rubber channel shaped gasket which completely surrounds the perimeter edges of the hood opening and the transparent cover. This rubber channel shaped gasket is of course somewhat elastic which is required for assembly of the parts.

The hood member is a molded product consisting of dark resins and fiber glass which is opaque. Its inside surface is a mat finish which tends to reduce light reflections to a minimum. The composition of material is such that it resists the accumulation of frost and moisture, thus lessening the possibilities of a fogging action within the protective covering. The cover plate is preferably made from sheet "Plexiglas" or other suitable transparent plastic material. As the transparent cover is mounted at an inclined angle which places it in a predominating downward facing position, the tendency of wet snow or sleet to accumulate thereon is greatly reduced.

An object of the present invention is the provision of a protective covering for a light signal lens wherein the hood member may be installed for permanent use; whereas, the transparent shield or cover for closing the hood opening may be readily attached prior to the winter season and quickly removed at any time merely by snapping on or off the elastic rubber channel shaped gasket.

Other objects, purposes and characteristic features of the present invention will be apparent from the following specification when considered in connection with the accompanying drawings in which:

Fig. 1 is a side elevational view partly in section and illustrating a conventional railroad light signal unit with the lens protective covering of the present invention attached thereto;

Fig. 2 is a front elevational view of the apparatus shown in Fig. 1 with the light signal casing partially broken away;

Fig. 3 is a bottom plan view of the apparatus shown in Fig. 1 with the light signal casing partially broken away;

Fig. 4 is an enlarged sectional view of the elastic rubber gasket of the present invention and shows the formation of the channel shaped cross section of the gasket; and Fig. 5 is a partial enlarged sectional view showing the position of the channel shaped rubber gasket with respect to the hood flange and the cover plate when the gasket is in place.

In the drawings the different parts will be referred to by distinctive reference characters and all like parts the same reference characters. Referring now to Figs. 1, 2 and 3, there has been shown in brief a typical light signal unit with the lens protective covering means of the present invention attached thereto. Although the light signal unit chosen for the purpose of illustration is of the color position type commonly used in railway signalling practice and shown more in detail in the U.S. patent to O. S. Field, No. 2,239,316, dated April 22, 1941, it should be understood that the lens protective covering means of the present invention could be applied to any of the well known outdoor type of signal units.

Briefly, the light signal unit shown comprises an inner casing 11 which houses a lamp unit 12, a reflector 13, an inner lens 14 and a three color position spectacle 15 which is operable to any one of three positions. The operating mechanism (not shown) positions the spectacle 15 so that one of its color glasses is in the direct line of the light beam and the colored light beam passes through the inner lens 14. The inner casing 11 is adjustably mounted in an outer casing 16 which has a gasketed door 17 hinged thereon to provide a weather proof housing. The front of the outer casing 16 is provided with a round flanged opening 18 directly in front and in line with the inner lens 14, into which is placed an outer lens 19. This outer lens 19 is held in place by a bezel ring 20 which is fastened to the outer casing 16 by means of screws 21, gasket cement 22 weather proofing the joint.

The bezel ring 20 is provided with an outwardly projecting circular flange 23 which serves as a means for supporting and attaching the hood member 25 of the present invention. This hood member 25 is of a molded tubular shape and is slightly flared so that the diameter of its outer end is larger than the diameter of its inner end which cooperates with the circular flange 23. The inner end of the hood 25 is formed to fit over and around the flange 23 and is fastened thereto by screws 26.

The overall length of the hood 25 is greater than its diameter so that the opening at its outer end can be formed at an inclined angle of less than 45 degrees extending downward and inward from its upper outward extremity to a point near its lower inward extremity. The edge of this outer hood opening is turned outward to form a flange portion 28 around its perimeter. The outer face of the flange portion 28 is in the same plane as the incline of the opening, thus presenting a flat outward surface around the perimeter of the opening upon which the transparent shield or cover plate 30 will bear.

It can now be seen from Figs. 1 and 3, that the opening in the outer end of the hood member 25 is facing in a predominating downward position and is of a substantially oval shape. The transparent shield or cover plate 30 is also oval shaped to match the hood opening and when in place the face of the cover plate 30 at its edges will bear flush against the outer face of the flange portion 28 and their edges will be flush around their perimeter. The cover plate 30 is held in place by an elastic rubber gasket 31 of a channel shape in cross section (see Fig. 4) which is stretched over and around the perimeter edges of the flange portion 28 and the cover plate 30.

Referring now more particularly to the enlarged detail views shown in Figs. 4 and 5, the rubber gasket 31 is a molded product made of an elastic type long life rubber, such as "neoprene" or the like. The channel shaped cross section is formed so that the width of the opening at its open end between the side portions 32 is less than the width of the opening at its base portion 33. Also, the circumference of the gasket is less than the circumference of the flange portion 28 and the cover plate 30. It can now be seen that when the gasket 31 is in place it will be in a stretched condition with the side portions 32 biased against the flange portion 28 and the cover plate 30 and the base portion 33 biased against the perimeter edges of the flange portion 28 and the cover plate 30.

As mentioned above, the hood 25 is a molded combination of dark resin and fiber glass material. In order that the inside surface of the hood present a mat finish, i.e. a dull non-reflecting surface, that portion of the mold forming the inside surface of the hood is sand blasted to give the desired result. If necessary, the hood may be painted a dull black to insure that it is absolutely opaque or non-reflecting.

Following the molding operation, suitable holes have to be drilled through the inner end of the hood for mounting on the flange 23. In this connection, it should be noted that the inner diameter of the hood 25 at its end passing over the flange 23, is approximately one sixty-fourth of an inch greater than the diameter of the flange 23. This fit is substantially weather proof so far as the passage of snow, sleet and the like is concerned, but it provides a rather small passage or breathing space to permit the atmospheric pressures to remain the same on opposite sides of the "Plexiglas" cover plate 30. This is necessary, since the "Plexiglas" cover plate 30 is relatively flexible and extreme changes in air pressure of the ambient air would cause it to be flexed or bent, since the rubber channel gasket 31 forms a substantially air tight seal between the hood flange portion 28 and the perimeter of the transparent cover plate 30.

It should also be noted that the external surface of the hood 25 and the transparent cover plate 30 represents an area substantially six times as great as the area of the light transmitting lens 19. This means that any heat that may be transmitted through the lens by the light beam or conducted through the lens to the space within the hood will be readily radiated so as to maintain the inside and the outside temperatures substantially the same, which greatly minimizes the possibility of the adherence of snow or sleet to the surface of the cover plate 30.

In summary, the protective covering proposed in the present invention provides a means whereby the light signal lens is fully protected against adverse weather hazards and still permits proper transmission of the light signal indications as intended, and also maintains such features whereby phantom indications due to light reflection from an outside source are prevented. The hood member 25 is an opaque and dull black color to prevent light reflections; and, it is molded of suitable materials to minimize the collection of frost as compared to metals. The transparent "Plexiglas" cover plate 30 which covers the opening in the hood 25 absolutely prevents the collection of wet snow or sleet on the signal lens. It has excellent light transmitting qualities and also minimizes the collection of frost on either side. The angular plane at which it is mounted practically eliminates the collection of any wet snow or sleet on its outside surface.

The elastic rubber gasket 31 provides a weather proof holding means for attaching the cover plate 30 and also affords a means whereby the cover plate 30 is quickly removed if desired during mild weather and quickly replaced when required, all without disturbing the mounting of the hood member 25, which, as previously mentioned, may be permanently mounted if desired.

One of the problems in connection with the provision of a hood for a signal lamp is that its shape provides sharp edges and protrusions over which the wind can blow to thereby make diverse air currents and allow air pockets to form in which snow can be initially deposited which then permits additional deposits of snow to build up and obscure the signal lens. In the embodiment of the present invention, the hood and transparent cover plate are combined in a way which minimizes protrusions and sharp edges adjacent the light transmitting surfaces. For this reason, there are no relatively quiet air pockets formed which allow the initial deposit of snow. Thus, the elastic rubber channel gasket is particularly useful in providing a replaceable means of attachment.

Having shown and described one specific form or embodiment of a protective covering for a light signal lens, it should be understood that various adaptations and deviations in the structure could be made without departing from the spirit of the invention within the scope of the appending claim.

What we claim is:

The combination with a light signal having a circular outer lens, of a cylindrical flange secured to the signal and extending outwardly substantially normal to the periphery of the lens, a cylindrical hood secured at one end over the outer surface of said flange, said hood being formed of insulating material and having an inside diameter at one end slightly larger than the outside diameter of said flange whereby a breather space is provided about the periphery of said hood to equalize the air pressure within the hood, the other end of said hood being formed at an elevational angle extending away from the outer lens, said other end of said hood having an outward hood flange formed therein, a clear plastic lens cover enclosing said other end of said hood, and a removable plastic channel resiliently securing the periphery of said lens cover to the periphery of said hood flange.

References Cited in the file of this patent

UNITED STATES PATENTS

| | | |
|---|---|---|
| 1,595,173 | Stiert | Aug. 10, 1926 |
| 1,653,064 | Robertson | Dec. 20, 1927 |
| 2,111,641 | Ritz-Woller | Mar. 22, 1938 |
| 2,187,582 | Anderson | Jan. 16, 1940 |
| 2,721,930 | Leaf | Oct. 25, 1955 |
| 2,765,400 | Scherer | Oct. 2, 1956 |